April 26, 1960 F. G. JORDAN 2,934,210
RACKS

Filed May 12, 1958 2 Sheets-Sheet 1

INVENTOR
FRANK G. JORDAN
by
PAT. ATT'Y

April 26, 1960 F. G. JORDAN 2,934,210
RACKS
Filed May 12, 1958 2 Sheets-Sheet 2

INVENTOR
FRANK G. JORDAN
by
Elmer L. Quickel
PAT. ATT'Y

United States Patent Office 2,934,210
Patented Apr. 26, 1960

2,934,210

RACKS

Frank G. Jordan, Chicago, Ill.

Application May 12, 1958, Serial No. 734,774

3 Claims. (Cl. 211—41)

The invention relates to improvements in racks for cooking utensils and implements, and is more particularly concerned with the novel construction and parts organization of a drip collecting rack or holder for dish, pot and pan covers; carving knives, forks, serving spoons, and the like.

Specifically, the novel rack or holder comprises a skeleton frame structure fabricated preferably from metal rod stock and shaped to provide support means for receiving a pan cover or the like therein and for holding it suspended over a drip tray located at the bottom of the rack. The rack also includes means for supporting such cooking implements as carving knives, forks, serving spoons and like implements over the tray and in such a position as to be conveniently grasped when their use is required. The rack or holder is especially designed for the purpose of allowing the user free use of both hands during cooking, for inspecting or turning food, or after cooking, for carving or serving directly from a dish, pot or pan that normally is closed by a removable cover.

It frequently happens that when a cover is removed from a dish or pan no convenient means is available to dispose of the same so as to leave both hands free for turning, carving or serving. The problem of cover or implement disposal is overcome by the use of the herein described rack which is designed to support a cover in a substantially vertical plane and in such a manner that any condensate or other fluids dripping therefrom are collected in the tray. The serving and carving implements carried in the rack may be easily removed therefrom for use and replaced therein after use.

It is therefore an object of the invention to provide a rack of the character described.

Another object of the invention is to provide a novel rack fabricated from rod stock and having a plurality of implement supporting surfaces thereon.

Another object is to provide a rack of the character described with novel means therein for supporting a cover in a position over a tray mounted in said rack.

Another object is to provide a rack of the character described with novel means integral therewith for supporting one or more cooking or serving implements in a readily available position over a drip tray.

Another object is to provide a rack of the character described which is not expensive to manufacture, is easy to use, efficient in its use and very practical.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of the invention, there is illustrated in the accompanying drawings, a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
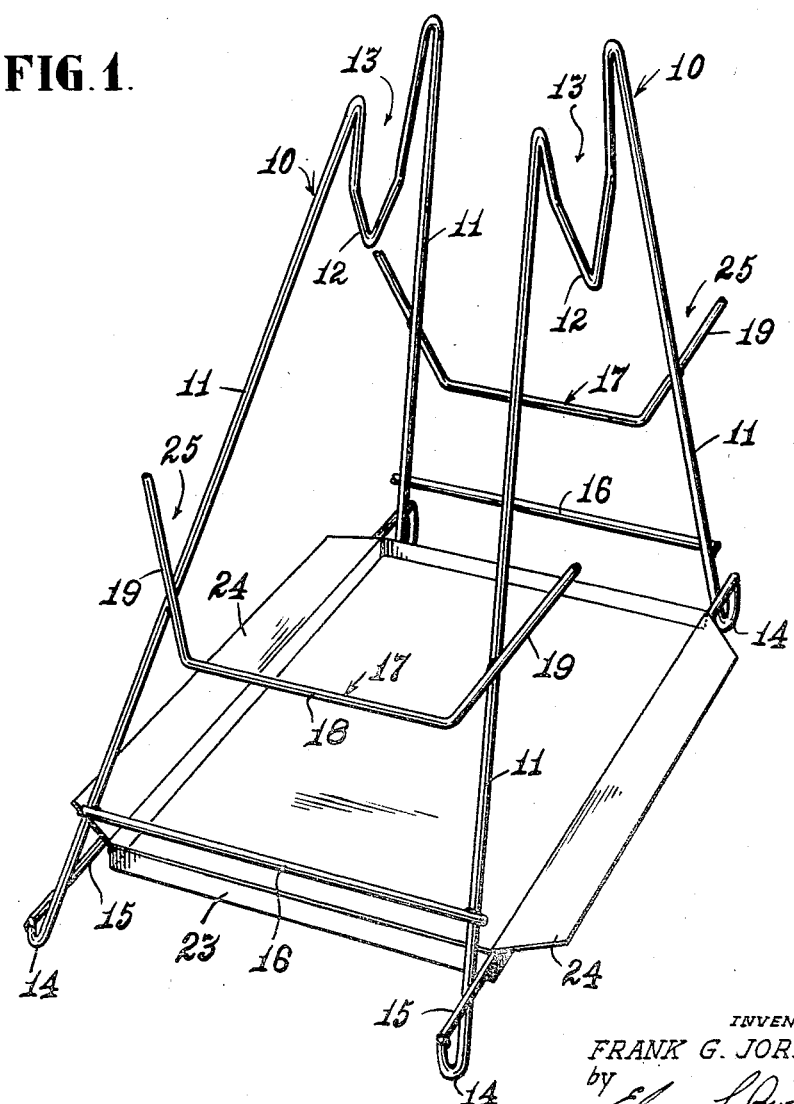
Fig. 1 is a perspective view of a rack or holder embodying the features of the invention.

Referring to the representative disclosure in the accompanying drawings, the rack or holder is fabricated in the form of a skeleton frame including a pair of like laterally spaced side frames 10 each fabricated from shape-retaining rod stock. Each frame 10 comprises upwardly-inwardly-longitudinally-inclined leg portions 11 integrally joined at their upper extremities in a downwardly extending substantially V-shaped bend 12 defining a recess 13. The free lower end of each leg portion 11 is turned outwardly upwardly to define a foot portion 14 and the terminal ends of the foot portions on each side frame are connected by a longitudinally extending rod 15, which rod is spot-welded, brazed, soldered or otherwise integrally connected to said terminal ends so as to provide a rigid side frame assembly.

Figure 3:
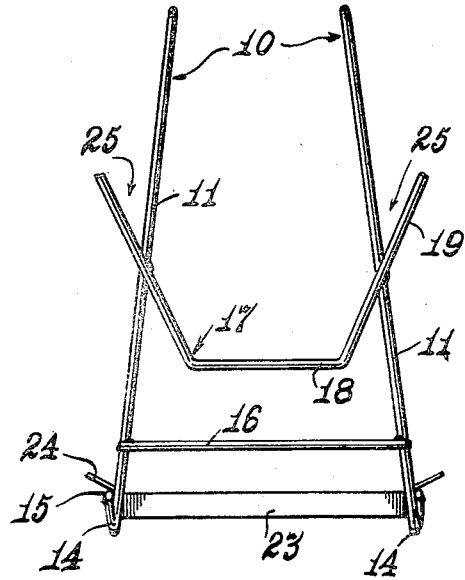
Fig. 3 is an end elevational view of the rack.

The two side frames 10 preferably are laterally inclined inwardly upwardly toward each other, as is best shown in Fig. 3, and they are connected together rigidly adjacent to their lower ends by transverse rods 16 secured as by welding or the like to the respective leg portions 11 of each side frame. Also bridging the frames 10 and secured firmly to the leg portions 11 at a distance above the transverse rods 16 are a pair of horizontally aligned support rods generally indicated at 17. Each of these rods includes a medial bridging portion 18 and upwardly-outwardly inclined end portions 19.

Figure 2:
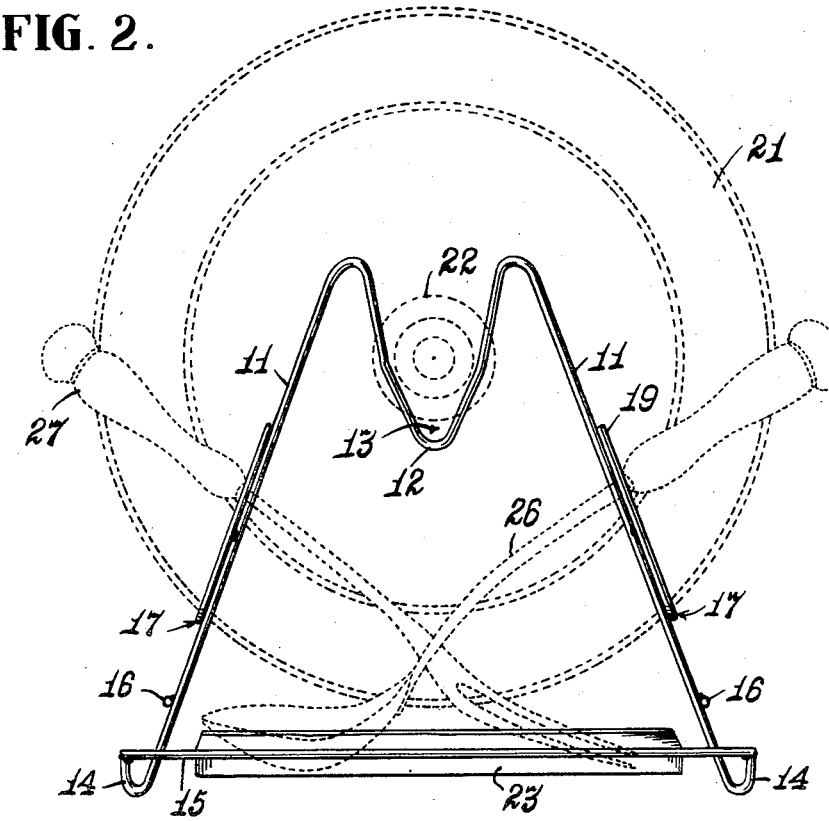
Fig. 2 is a side elevational view thereof, showing representative cooking implements arranged therein.

The skeleton frame thus provided is adapted to afford support means for a cover 21, shown in Fig. 2. The cover 21 is arranged substantially vertical between the side frames 10 and it has its centrally located handle or knob 22 seated in one of the V-shaped recesses 13. In the Fig. 2 disclosure, the cover illustrated is of such a diameter that it is supported primarily by resting on the support rods 17 and incidently also by its knob 22 in the recess 13. Larger covers would be supported entirely by the rods 17 and smaller covers would be supported entirely by their knobs 22 in the recesses 13. In either event, the cover is held suspended over a shallow drip tray 23 seated in the lower extremity of the rack. As shown, the tray 23 is removable and is substantially rectangular and of a size to fit snugly between the longitudinal rods 15 with its side wings 24 rested on the said rods.

The upwardly outwardly inclined end portions 19 of the support rods 17 each define, with the related leg portion 11 of the side frames, a substantially V-shaped trough 25 in which the handle portion of a cooking or serving implement, such as the spoon 26 and fork 27 (Fig. 2) illustrated may be rested so as to retain the implement in a position with its service end rested in the tray 23.

It will be apparent that the rack affords means to receive and support one or more covers and implements in such positions that all drip therefrom will be collected in the tray 23. The structure is such that the covers and implements are easily and quickly positioned therein and are readily available for quick removal. Furthermore, although the rack disclosed herein is fabricated from wire or rod stock, the same can readily be fabricated from other material such as by molding the frame in one piece or otherwise from suitable plastic material.

It is believed that the invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claims.

What is claimed and desired to secure by Letters Patent of the United States is:

1. A skeleton rack comprised of a pair of like spaced substantially triangular shaped side frames fabricated from rod stock, U-shaped foot portions formed at the base of each frame, a rod bridging each frame at its base and secured thereto, a drip pan loosely suspended from said rods and bridging said frames, a downwardly extending substantially U-shaped recess formed at the apex of each frame adapted to support an article between said frames and above the drip pan, end brace rods connected to and bridging said frames and spaced above the tray, each of said brace rods having end portions extending outwardly laterally of said frames and upwardly at an incline, said end portions constituting support means for one end of an implement having its other end rested in the tray.

2. A skeleton rack comprised of a pair of like spaced substantially triangular shaped side frames fabricated from rod stock, said frames being inclined upwardly inwardly toward each other, a rod bridging each frame at its base and secured thereto, a drip pan loosely suspended from said rods and extending between said frames, a downwardly extending substantially U-shaped recess formed at the apex of each frame adapted to support an article between said frames and above the drip pan, end brace rods connected to and bridging said frames, and spaced above the pan, each of said brace rods having end portions extending outwardly laterally of said frames and upwardly at an incline, said end portions constituting support means for one end of an implement having its other end rested in the pan.

3. A skeleton rack comprised of a pair of like spaced substantially triangular shaped side frames fabricated from rod stock, said frames being inclined upwardly inwardly toward each other, U-shaped foot portions formed at the base of each frame, a rod bridging each frame at its base and secured thereto and to the foot portions, a drip pan, flanges on opposed sides of said pan seated on the rods, a downwardly extending substantially U-shaped recess formed at the apex of each frame adapted to support an article between said frames and above the drip pan, end brace rods connected to and bridging said frames, and spaced above the pan, each of said brace rods having implement supporting end portions extending outwardly laterally of said frames and upwardly at an incline.

References Cited in the file of this patent
UNITED STATES PATENTS

| | | |
|---|---|---|
| 804,481 | Lawrence | Nov. 14, 1905 |
| 1,065,000 | Sarter | Jan. 17, 1913 |
| 2,629,498 | Marasigan | Feb. 24, 1953 |

FOREIGN PATENTS

| | | |
|---|---|---|
| 9,540 | Sweden | Jan. 28, 1899 |